Dec. 20, 1966     H. C. KRONE     3,292,814
FUSIBLE PRESSURE RELIEF FOR TANKS AND THE LIKE
Filed March 15, 1965     2 Sheets-Sheet 1
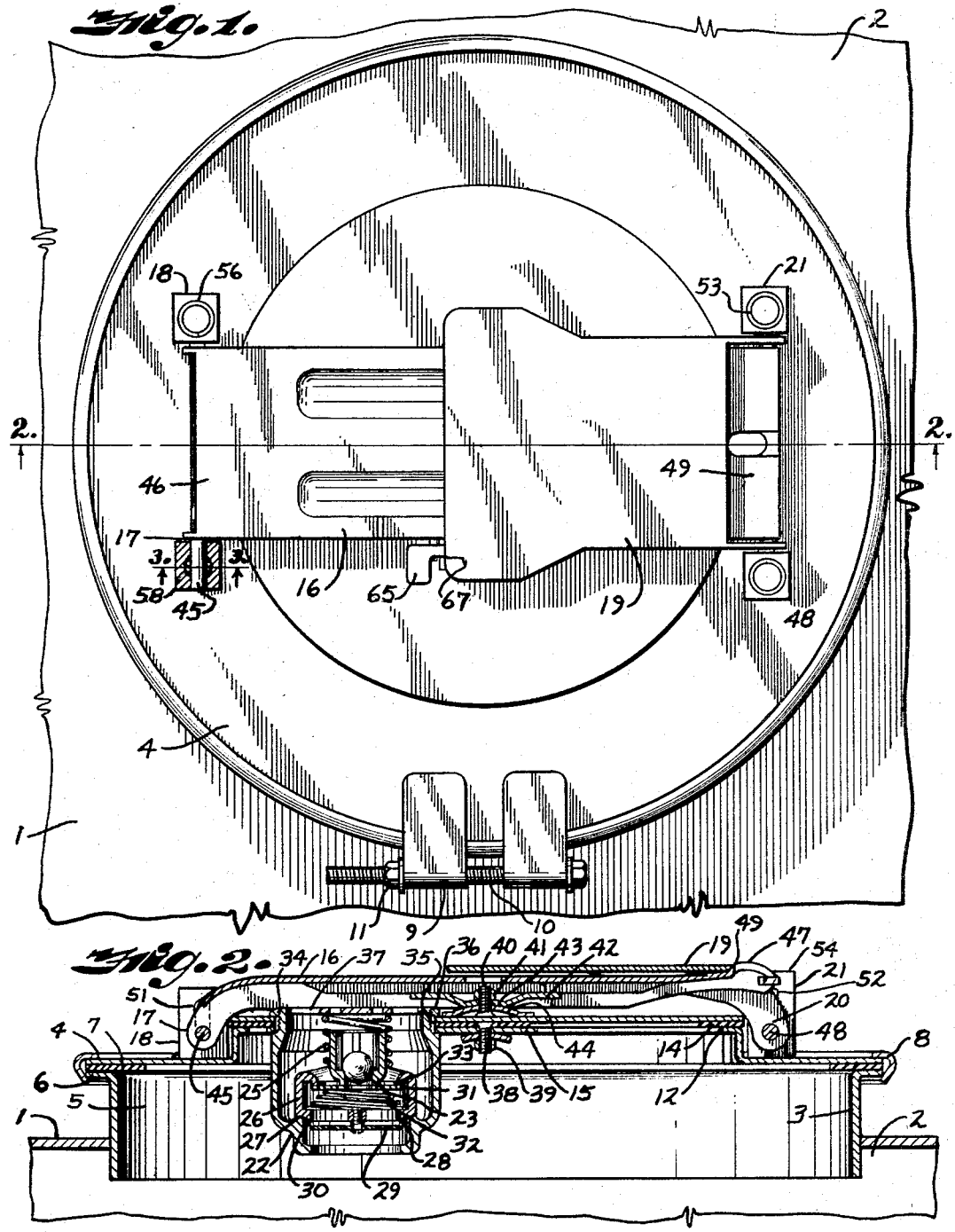
INVENTOR.
Howard C. Krone
BY
Fishburn and Holt
ATTORNEYS Dec. 20, 1966  H. C. KRONE  3,292,814
FUSIBLE PRESSURE RELIEF FOR TANKS AND THE LIKE
Filed March 15, 1965  2 Sheets-Sheet 2

INVENTOR.
Howard C. Krone
BY
Fishburn and Gold
ATTORNEYS

United States Patent Office 3,292,814
Patented Dec. 20, 1966

3,292,814
FUSIBLE PRESSURE RELIEF FOR TANKS
AND THE LIKE
Howard C. Krone, Overland Park, Kans., assignor to
William A. Knapp Company, Kansas City, Mo., a corporation of Missouri
Filed Mar. 15, 1965, Ser. No. 439,545
12 Claims. (Cl. 220—89)

This invention relates to heat-responsive pressure relief devices, and more particularly to a device for safely relieving internal pressures in receptacles or the like such as tanks containing flammable materials.

It is common practice in tank structures containing flammable materials and the like to have vent valves in a fill cap or manhole cover or otherwise suitably connected to the tank to afford some movement of air or gas to or from the tank under normal conditions to prevent excessive differential pressure between the interior of the tank and the atmosphere. However, in the event of a fire or otherwise subjecting of the tank to extreme heat, there can be a rapid increase in internal pressures wherein the normal relatively small vent valves provide insufficient relief for the emergency.

The principal objects of the present invention are to provide a heat-responsive pressure relief device for receptacles such as tanks wherein the device includes fusible members which, upon melting, afford emergency relief areas of large proportions; to provide an emergency relief vent structure wherein a closure member seals a flow aperture and is held in place by members supported in structures having fusible metal members which melt due to being subjected to extreme heat and allow the closure to raise to a limited height for safely relieving internal pressure and then permit the closure to return to sealing position after excess pressure is relieved; to provide such a relief structure wherein a fill cap or manhole cover is swingably mounted in hinge bearings movably mounted in supports with fusible metal members holding the bearings against movement and with a latch member retaining the cap or closure in closing position whereby melting of the fusible metal members allows the bearings to move and the closure to raise to a limited height for relieving the internal pressure of the receptacle or tank; to provide such a structure wherein the latch is supported in hinge bearings movable in supports which are diametrically opposite the hinge bearings of the closure with said hinge bearing supports having elongate openings in a direction away from the tank and fusible metal retainers holding said bearings whereby upon melting of the fusible metal retainers the closure or cap may be raised by the internal pressure of the tank or receptacle; to provide such a structure wherein the hinge members supported in the bearings are at ends of the openings adjacent the tank whereby melting of the fusible metal retainers releases the bearings for movement of the hinge members away from the tank for raising of the closure; to provide such a structure wherein the fill cap or closure has a vent valve for eliminating excessive differential pressure between the interior and exterior of the tank under normal conditions with the mounting of the fill cap providing large capacity emergency relief when subjected to extreme heat; and to provide a heat-responsive pressure relief device that is economical to manufacture, positive in operation in supporting a closure for normal usage and yet affords suitable pressure relief under emergency conditions.

Other objects and advantages of this invention will become apparent from the following description taken in connection with the accompanying drawings wherein are set forth by way of illustration and example certain embodiments of this invention.

FIG. 1 is a top plan view of a manhole or fill cover closure for pressure relief in accordance with my invention.

FIG. 2 is a vertical sectional view through the closure taken on the line 2—2, FIG. 1.

Figure 3:
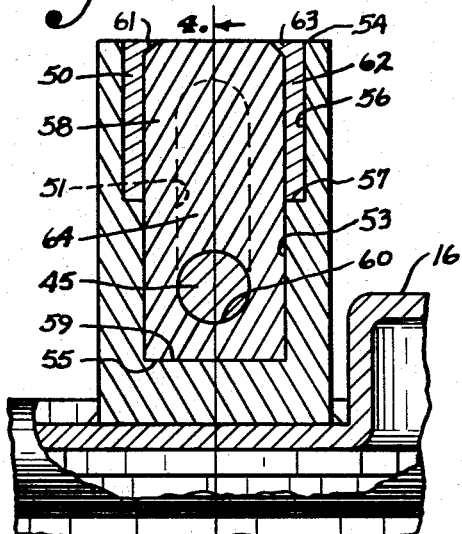
FIG. 3 is a vertical sectional view greatly enlarged taken through the hinge mounting on the line 3—3, FIG. 1.
Figure 4:
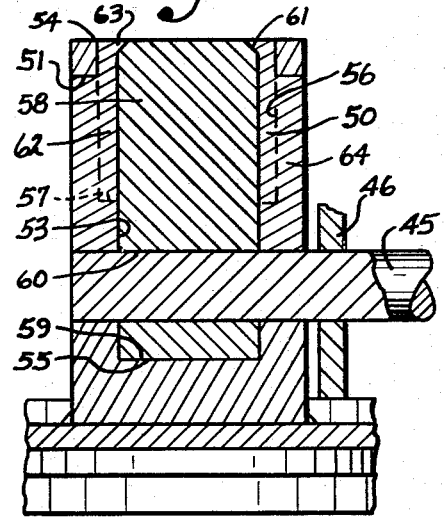
FIG. 4 is a vertical sectional view through the hinge mounting taken on the line 4—4, FIG. 3.

Referring more in detail to the drawings:

In the drawings, I show a fragmentary portion of the upper wall 1 of a storage or transportation tank or receptacle 2 formed of sheet metal or other suitable material and adapted to contain liquids or fluids as, for example, flammable materials. The wall 1 of the tank 2 is provided as is usual practice with a manhole defined by an annular neck 3 which is welded or otherwise suitably attached to the wall 1 in a leakproof fashion. A cover 4 is suitably secured to the neck to provide a seal for the manhole opening 5. In the structure illustrated, the annular neck 3 has an outturned flange 6 around its upper periphery, said flange 6 preferably being in a flat plane and serving as a seat member. A circular gasket 7 of sealing material is positioned between the cover 4 and the flange 6 to form a seal therebetween. The cover 4 is secured to the flange 6 by means of a split clamping ring 8 of channeled contour in section with each split end having clips 9 through which extend a clamping bolt 10 retained by a clamping nut 11. When the bolt 10 and nut 11 are drawn up, they tighten the clamping ring to exert a wedge grip on the flange 6 and cover 4 to secure same together. Slacking off the nut 11 permits ready removal of the ring 8 which is biased to spring open sufficiently to permit its removal from the cover 4 and flange 6.

In the structure illustrated, the cover 4 has a fill opening 12 normally sealed by an assembly which includes a fill cap or plate 13, a circular gasket of sealing material 14 and a retaining plate 15 all carried on crossbar 16 that is hinged as at 17 on lugs 18 attached to the cover 4. A suitable lock member 19 is hingedly mounted as at 20 on lugs 21 attached to the cover 4, said lock member or lever 19 being engaged with the crossbar 16 to secure same in closing position. In the structure illustrated, the fill plate or cap 13 carries a vent unit 22 to provide for escape of vapor pressure from within the tank or for entry of air into the tank to effect substantial equalization of pressure between the tank and the exterior thereof under normal conditions.

The vent unit 22 includes a ball 23 that will lift under low pressures to provide some escape of internal pressure. There is also a spring 25 biasing a valve member 26 onto a seat 27 around an opening 28 for increased escape of internal pressure when the pressure is sufficient to lift the valve member 26 and compress the spring 25. The valve member 26 carries a resilient diaphragm 29 normally open but upon a sudden surge from the interior said valve member will engage a seat 30 to close flow. Should the pressure within the tank suddenly drop by reason of dumping or discharge of liquid from the tank, a valve disc 31 biased by a spring 32 against a seat 33 will be drawn open permitting pressure equalization. The vent unit 22 has an upper end 34 that extends through aligned apertures 35 in the retaining plate 15, gasket 14 and cap plate 13 and is held therein by a nut or other fastener 36 so that the top openings or ports 37 of the vent unit are open to the atmosphere preferably under the crossarm 16.

The retaining plate 15 is secured to the fill cap or plate 13 with the seal member 14 therebetween by means of a stud 38 and nut 39. Also, the fill cap plate 13 is secured by means of a stud 40 and nut 41 to a transverse member 42 on the crossarm 16 with the engaged parts having concave and convex portions 43 and 44 to provide a swivel and self-aligning feature.

In the structure illustrated, the crossarm 16 which may be termed a strongback has a hinge pin 45 that extends laterally outwardly from an end 46 of said crossarm with the end extensions of said pin mounted in the lugs 18. The opposite end portion of said crossarm has a cam portion 47. The locking lever 19 has a hinge pin 48 that extends laterally outwardly and is mounted in the lugs 21, said locking lever having a cam-engaging surface 49 whereby when the locking lever is moved into a position overlying the crossarm 16, the cam portions 49 engaging the cam 47 applies pressure to the crossarm to hold same downwardly and retain the fill cap or plate 13 in closing position relative to the opening 12. Portions of the structure are retained by fusible metal members 50 arranged to melt at a predetermined temperature and permit movement of the structure whereby the cap or plate may be raised from its closed position in response to internal pressure in the tank or receptacle and thereby provide a large size capacity relief vent for quickly relieving elevated pressures in the tank.

In the structure illustrated, the hinge pins 45 of the crossarm or strongback are mounted in a pair of lugs 18 at one side of the opening 12 and oppositely disposed relative to laterally spaced lugs 21 of a pair that mount the hinge pin 48 of the locking lever. The pair of lugs 18 have elongate openings 51 and the pair of lugs 21 have elongate openings 52 all of which extend in a direction outwardly of or away from the cover 4. It is preferable that the elongate openings in one pair of lugs be longer than the openings in the other pair and, in the illustrated structure, the openings 52 are the longer. This difference in length of the openings permits a greater extent of lifting of the fill cap or plate 13 when relieving pressure, as later described.

Each of the lugs 18 and 21 have vertical bores 53 extending downwardly from the upper ends 54 of the lugs and terminating as at 55 below the lower ends of the elongate openings or slots 51 and 52. The upper portions of the bores are enlarged to provide a counterbore 56 that extends downwardly from said upper ends 54 terminating in shoulders 57. Slidably mounted in the bores 53 are bearing members 58 having lower ends 59 adapted to rest on the bore ends 55. Said bearing members have transverse bearing bores 60 registering with lower portions of the elongate openings 51 and 52 respectively whereby the hinge pins 45 and 48 extend through the respective elongate openings 51 and 52 and are mounted in the bearing openings 60 of the bearing members 58. The upper ends of the bearing members 58 are arranged to provide upwardly facing shoulders 61 below the level of the upper ends 54 of the lugs. After the bearing members are mounted in the lugs, fusible metal bushings 62 are applied to the counterbores 56 and have portions 63 engaging the upwardly facing shoulders 61 to form a retaining member to hold the bearing members 58 against upward movement in the bores of the lugs. When the lugs are of suitable material such as steel, the fusible metal will bond to the steel with such bond providing sufficient anchorage for the fusible metal bushings. Fusible metal members 64 are also bonded in the elongate openings 51 and 52 and extend from engagement with the hinge pins to the upper ends of the openings to form further retainers to hold the hinge pins against upward movement. The fusible metal of bushings 62 and members 64 preferably is composed of bismuth, lead and tin which can be melted and poured at low temperatures which are only slightly above the fusing temperature for which they are compounded. The fusible metal will bond to certain metals such as steel, iron, brass and the like. In the structure illustrated, the bushings 62 and members 64 join or fuse into integral structures. In assembling the structure, the bearing members 58 are inserted in the bores of the respective lugs. Then the closure parts and hinge pins are installed. The bearing plugs 58 are clamped to hold them against the surface 59. Side plates are applied to the sides of the lugs to cover the elongate openings 51 and 52 and close same. Then, molten fusible metal is poured into the counterbores 56 around the bearing plugs or members 58, and this molten metal runs down into the elongate openings 51 and 52 filling same and filling the counterbore 56. The side plates retain the fusible metal until it solidifies. Then said side plates are removed and the fusible metal members retain the bearing members 58 in the lugs.

Figure 5:
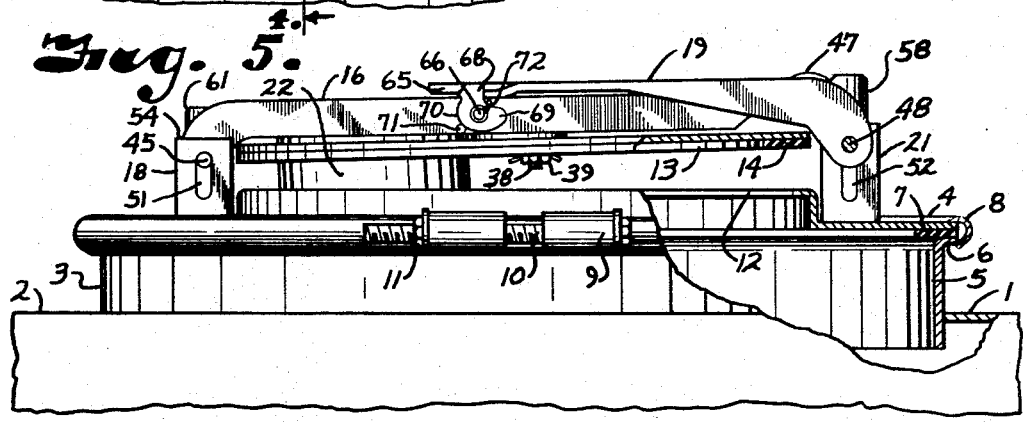
FIG. 5 is an elevational view of the closure after melting of the bearing members and in pressure relieving position.

It is preferred that a safety catch and latch release be provided to prevent accidental release of the latch lever as, for example, if the tank should be turned over. In the structure illustrated, the safety catch consists of a finger 65 rotatably mounted on a pin 66 extending laterally from the crossarm 16 adjacent the end 67 of the latch lever 19. The finger 65 has a detent 68 engaging over the end portion of the latch lever and also an eccentric extension 69 extending under said latch lever 19. The eccentric portion has a periphery 70 that in latched position engages a stop pin 71 that tends to limit downward movement of the latch lever. There is a spring 72 mounted on the pin 66 and engaging the finger to urge same into latch lever engaging position, as illustrated in FIG. 5. This retains the latch lever in position at all times and prevents accidental release thereof. However, release may be effected by downward pressure on the finger 65 rotating same in an anti-clockwise direction, FIG. 5, thereby releasing the engagement of the detent portion 68 with the end of the lock lever 19. The releasing action in the counter-clockwise rotation of the safety catch thrusts the end of the eccentric portion 69 against the bottom of the latch lever 19 and raises same to effect release of the lock engagement of the lock lever with the strongback or crossarm 16. This safety catch and the mounting of the hinge pins of the crossarm and lock lever hold the fill cap or plate 13 in position sealing the opening 12 at all temperatures below that at which the fusible metal is to melt. When the structure is subjected to a predetermined melting temperature, the bushings 62 and members 64 melt and then internal pressures in the tank may raise the fill cap or cover plate 13 upwardly off of the seat due to the bearing members 58 being free to rise upwardly in the bores 53. This upward movement may be to the extent wherein the hinge pins 45 and 48 engage the upper ends of the respective elongate openings 51 and 52. This provides a substantial lift so that the raising of the fill cap provides a large emergency relief area for rapid venting of the interior of the tank.

When the tank is used for containing flammable material such as gasoline or the like and with a structure constructed and assembled as described, for pressures of, for example, 3 pounds per square inch, the vent unit 22 will provide for the opening of the ball valve and, in the event of additional pressure as, for example, up to 5 pounds per square inch, the valve member 26 may provide additional areas as, for example, approximately 2.1 square inches of area for a relief at the rate of approximately 460 cubic feet per minute. However, in case of fire, the elevated temperature at the manhole will melt the fusible metal bushings 50 at, for example 200 degrees F., allowing the fill cap 13 to raise sufficiently at 5 pounds per square inch to permit relief through 23.5 square inch area of 5,000 cubic feet per minute with an opening 12 of approximately 10 inches in diameter. The structure and arrangement of the fusible members are such that the manhole cover and fill cap may be repeatedly opened and closed and, when the fill cap is latched in place, the hinge pin bearings are fully supported until such time as the structure is subjected to elevated temperatures as in the case of a fire, and then the fusible members will provide a release of the hinge connections whereby the cap 13 will raise under internal pressure to permit the emergency release and then after the pressure has been relieved the cap will return to seated position due to the weight of the cap structure.

Figure 6:
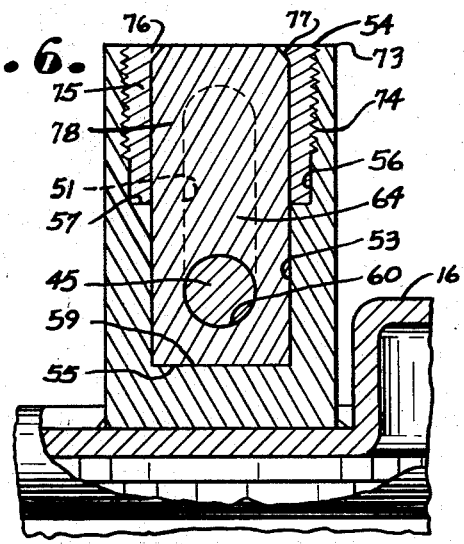
FIG. 6 is an enlarged sectional view through a modified form of hinge mounting.

In the structure illustrated in FIG. 6, the fusible mountings are of a structure particularly adapted for use of metals such as aluminum or the like that do not provide the desired bond with the fusible metal. In this form of the invention, the only difference in the structure is that the counterbore in the lug 73 is provided with internal threads 74 that form anchoring surfaces to which the fusible metal or bushing 75 conforms when applied in a molten state. With this arrangement, the engagement of the fusible metal 75 with the bearing member 78 retains same against upward movement until after the melting of th fusible bushing or metal. It is preferred that the fusible metal 75 also have a top inwardly extending flange 76 engaging the upwardly facing shoulder or surface 77 of the bearing member 78.

It is to be understood that while I have illustrated and described certain forms of my invention, it is not to be limited to the specific forms or arrangements of parts herein described and shown except insofar as such limitations are included in the claims.

What I claim and desire to secure by Letters Patent is:

1. A heat-responsive pressure relief device for a closed receptacle containing a volatile liquid comprising,
   (a) means providing a flow aperture with a peripheral seat,
   (b) a closure member seatingly engaged with said seat, means pivotally mounting said closure member for lifting movement from said seat,
   (c) a latch member engaging said closure member to retain same in aperture closing position,
   (d) lug means supported adjacent said aperture and having an elongate opening therein,
   (e) a pin extending into said opening and carrying said latch member and movable outwardly of said aperture,
   (f) and a fusible member in said lug means elongate opening and retaining said pin against outward movement, said outward movement being permitted in response to fusing of said member to permit lifting of said closure member from said seat.

2. A heat-responsive pressure relief device as set forth in claim 1 wherein the closure mounting means is a pair of lugs disposed adjacent said aperture and have elongate openings therein with a fusible member in the elongate opening with a pin mounted in said pair of lugs and hingedly mounting the closure member.

3. A heat-responsive pressure relief device as set forth in claim 2 wherein the pair of lugs and the lug means have elongate openings that are elongate in a direction outwardly relative to said aperture and the fusible members are elongate and fill said openings and the pins are adjacent inner end portions of said elongate opening whereby on fusing of the members the pins may move outwardly for the length of said openings to effect a lifting of the closure member from the seat.

4. A fused tank vent comprising:
   (a) a tank having a wall defining an aperture with a peripheral portion therearound,
   (b) a closure member overlying said peripheral portion and seating thereon,
   (c) lugs on opposite sides of said aperture,
   (d) means carrying said closure member and having one end hinged on said lugs at one side of said aperture,
   (e) a lock lever having one end hinged on the lugs on the other side of the aperture and extending therefrom in overlying relation to said closure member,
   (f) said latch lever having cooperating engagement with said closure member carrying means when in closed position to retain the closure member seated on said wall,
   (g) a fusible bushing in each of said lugs,
   (h) and bearing members in said lugs and movable in a direction outwardly of the tank wall, said bearing members having bores therein for receiving the hinge of the respective closure member carrying means and lock lever, said fusible bushings engaging the respective lugs and bearing members for retaining the respective bearing members against outward movement whereby fusing of the bushings permits outward movement of the respective hinges and closure member in response to pressure in the tank to unseat the closure member and vent the tank interior.

5. A fused tank manhole cover vent as set forth in claim 4 wherein the lugs are in pairs and the hinges are hinge pins mounted in the said bearing members in the respective pairs of lugs and supporting the closure member and lock lever.

6. A fused tank manhole cover vent as set forth in claim 5 wherein the lugs have elongate openings extending in a direction outwardly of the tank and the hinge pins have portions extending therein in a portion adjacent the tank and said fusible members are secured in said openings in engagement with said hinge pin portions to cooperate with said bushings to retain said pin portions against movement outwardly relative to the tank whereby on fusing of said fusible members and bushings the bearing members and pins are movable away from the tank to move the closure member away from said flange in response to internal pressure in said tank.

7. A fused tank manhole cover as set forth in claim 4 wherein the bearing members are slidable in bores in the respective lugs and have an outwardly facing surface and the fusible bushings are fixed to the lugs and have a portion in overlying engagement with said surface of the respective bearing member.

8. A fused tank manhole cover as set forth in claim 7 wherein the fusible bushings are threaded into the lug bores.

9. A fused tank manhole vent comprising:
   (a) a tank having a manhole aperture with a peripheral flange fixed therearound,
   (b) a closure member overlying said flange and having a gasketed seal therewith,
   (c) laterally spaced upstanding lugs on one side of said aperture exteriorly of said flange,
   (d) a crossbar having one end hinged on said lugs and extending substantially diametrically of said aperture,
   (e) a lock means movably mounted on said tank and having cooperating engagement with said crossbar when in closed position to retain the closure member seated on said flange,
   (f) said lugs having bores extending therein toward the tank and aligned elongate openings in opposed sides thereof extending into said bores,
   (g) bearing members slidable in each of said bores outwardly of said tank, said bearing members having aligned bearing bores receiving the hinge of the crossbar,
   (h) and a fusible member in each of the lug bores and elongate openings for engaging the respective bearing member and the hinge of the crossbar to retain said bearing member against sliding movement with fusing of the fusible members permitting outward movement of the respective hinges and closure member in response to pressure in the tank to vent the tank interior.

10. A fused tank manhole vent comprising:
    (a) a tank having a manhole aperture with a peripheral flange fixed therearound,
    (b) a closure member overlying said flange and having a gasketed seal therewith,
    (c) laterally spaced upstanding lugs on opposite sides of said aperture exteriorly of said flange,
    (d) a crossbar having a hinge pin at one end hinged on said spaced lugs at one side of said aperture and extending substantially diametrically thereof, said crossbar carrying said closure member, (e) a lock lever having a hinge pin at one end hinged on the spaced lugs on the other side of said aperture and extending therefrom in overlying relation to said crossbar, (f) said crossbar and latch lever having cooperating shoulders which engage in retaining position when in closed position, (g) said lugs having bores extending therein toward the tank and aligned elongate openings in opposed sides thereof extending into said bores, (h) bearing member slidable in each of said lug bores outwardly of said tank, said bearing members having bearing openings aligned with the respective elongate opening and receiving hinge pins that extend therethrough and mount the crossbar and lock lever, (i) and a fusible member in each of the lug bores and elongate openings for engaging the respective bearing member and the hinge pin of the respective crossbar and lock lever to retain said bearing member against sliding movement with fusing of the fusible members permitting outward movement of the respective hinges and closure member in response to pressure in the tank.

11. A fused tank manhole cover as set forth in claim 10 wherein a latch member having a detent normally engaging the lock lever is pivotally mounted on the crossbar and is biased into said detent engaging position to hold the lock lever in locked overlying position whereby the lock lever is moved to crossbar released position only when released from the latch member.

12. A heat-responsive pressure relief device for a closed receptacle containing a volatile liquid comprising, (a) means providing a flow aperture with a peripheral seat, (b) a closure means seatingly engaged with said seat, (c) lug means oppositely disposed adjacent said aperture with each lug means having an elongate opening therein, (d) said closure means having a portion movably mounted in the elongate opening of said lug means on one side of said aperture, (e) a latch member having a portion movably mounted in the elongate opening of the lug means on the other side of said aperture, (f) fusible members in the elongate openings of said lug means and engaging the respective closure means portions and latch portions to retain same against movement in said elongate openings, (g) said latch member engaging said closure means to retain same in aperture closing position and fusing of said fusible members permitting movement of the respective portions of the closure means and latch member to move in said elongate openings and permit lifting out said closure means from said seat.

References Cited by the Examiner
UNITED STATES PATENTS

| | | | |
|---|---|---|---|
| 1,362,223 | 12/1920 | Braman | 220—89 |
| 1,720,694 | 7/1929 | Schlesinger | 220—89 |

THERON E. CONDON, *Primary Examiner.*

RAPHAEL H. SCHWARTZ, *Examiner.*